June 11, 1963     M. J. HUBER     3,092,983

TORQUE CLUTCH

Filed Dec. 19, 1960

INVENTOR

*Mortimer J. Huber*

BY *Robertson Dunning*

ATTORNEY

United States Patent Office 3,092,983
Patented June 11, 1963

3,092,983
TORQUE CLUTCH
Mortimer J. Huber, 2141 N. Avon, St. Paul, Minn.
Filed Dec. 19, 1960, Ser. No. 76,609
6 Claims. (Cl. 64—30)

This invention relates to an improvement in torque clutch and deals particularly with having a torque controlled member such as a pulley, gear, sprocket or the like which will slip when subjected to a predetermined torque load.

In various types of machinery, it is necessary to provide some means of preventing undue strain. For example, if the apparatus becomes overloaded due to malfunctioning of the mechanism, in many cases serious damage may result if the load continues and the power continues to drive the apparatus. The torque clutch which I have produced alleviates this difficulty and permits the power source to continue in operation until it can be turned off if a predetermined torque load is attained.

A feature of the present invention lies in the fact that my apparatus is extremely simple and inexpensive to produce and accordingly may be supplied at a relatively low cost.

These and other objects and novel features of the present invention will be more clearly and fully set forth in the following specification and claims.

In the drawings forming a part of the specification:

Figure 1:
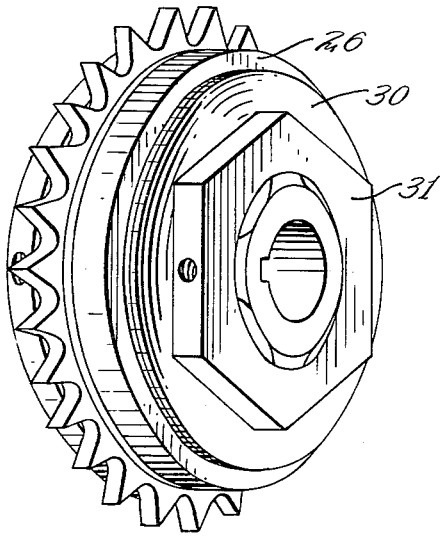
FIGURE 1 is a perspective view of the torque clutch showing a sprocket as the torque controlled member.

The torque clutch includes a main body portion which is indicated in general by the numeral 10. The body portion 10 includes a plate or disc 11 having a sleeve or hub projecting from one side thereof as indicated in general at 12. The hub 10 is provided with a short portion adjoining the disc 11 which has a cylindrical outer surface 13. The remainder of the hub 12 is generally rectangular in cross section, having arcuate threaded portions 14 between the flat surfaces 15. The hub 12 is provided with an internal keyway 16 so that the clutch may be keyed to a shaft such as 17 by means of an elongated key such as 19. A set screw 20 is provided in a threaded aperture 21 which extends radially through the disc 11 and intersects the keyway 16. The set screw 20 may be tightened to hold the key from axial movement in the keyway.

Encircling the cylindrical portion 13 of the hub is provided a roller bearing 22 which includes rollers 23 in contact with the outer cylindrical surface 13. A torque controlled member such as the sprocket 24 is supported upon the roller bearing 22 for rotation relative to the hub. A pair of friction rings 18 and 25 also encircle the roller bearing 22 on opposite sides of the torque controlled member 24. It will be understood that this member 24 may comprise a pulley, a gear, or other such member rather than a sprocket.

Figure 2:
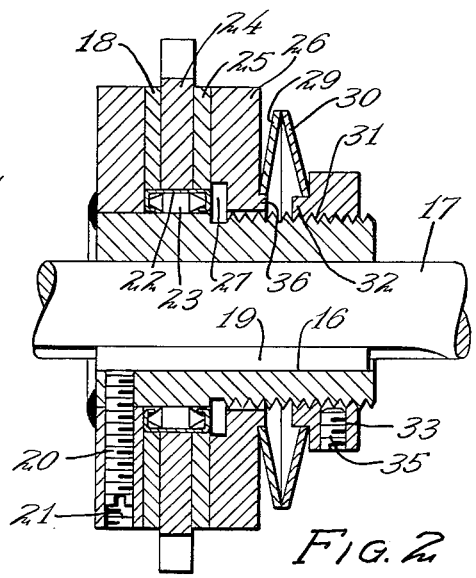
FIGURE 2 is a sectional view through the clutch illustrated in FIGURE 1.
Figure 3:
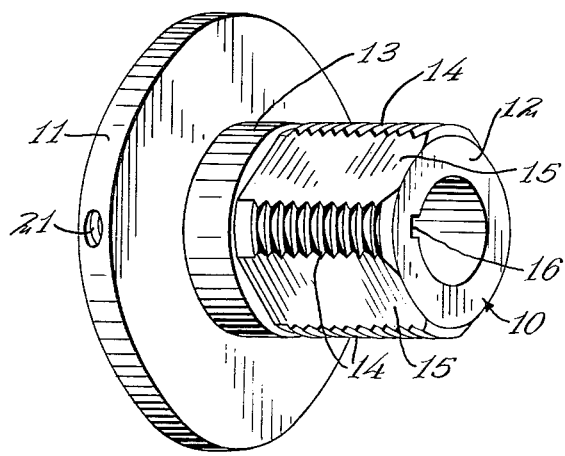
FIGURE 3 is a perspective view of a portion of the clutch in disassembled form.
Figure 4:
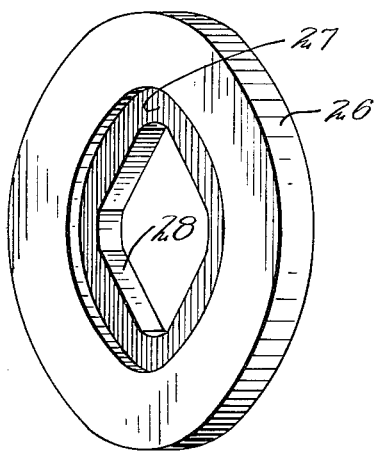
FIGURE 4 is a perspective view of the pressure plate showing the general construction thereof.

A bearing plate 26 having a shallow socket 27 in one surface thereof is supported upon the rectangular portion of the hub. As indicated in FIGURE 2 of the drawings, the face of the disc 26 which engages the friction ring 25 is of approximately the same area as the friction disc. As may be best seen in FIGURE 4 of the drawings, the disc 26 is provided with a generally rectangular aperture 28 extending therethrough, this aperture 28 being slidably engageable over the squared portion of the hub to prevent the bearing plate 26 from rotating relative to the hub. A pair of concavo convex resilient washers 29 and 30 are interposed between the bearing plate 26 and a clamping nut 31. The clamping nut 31 is provided with an axially extending flange 32 to fit the inner surface of the ring 30. A similar shoulder may be provided on the bearing plate 26 if it is so desired. Alternatively, the resilient washer 29 may be omitted and the peripheral edge of the washer 30 may bear directly against the bearing plate 26.

One or more threaded apertures 33 are provided in the nut 31 for the accommodation of set screws such as 35. The set screws 35 may bear against one of the flat surfaces 15 of the square portion of the hub to hold the nut in an adjusted position.

In operation, the nut 31 is tightened to provide a predetermined tension on the resilient washers 29 and 30 to frictionally engage the torque controlled member 24 with the friction washers 24 and 25 and to create friction between the washers 24 and 25 and the disc 11 and bearing plate 26 respectively. If the sprocket or other torque controlled member 24 is placed under a predetermined strain, the torque controlled member may slip relative to the disc 11 and bearing plate 26, which parts are held from relative rotation. Obviously, the greater the pressure exerted by the discs, the more torque may be delivered without any slip taking place.

A cylindrical shoulder 36 is also provided on the bearing plate 26 which engages inwardly of the disc 29 to hold this disc centered. While the clutch is shown with opposed discs 29 and 30, the disc 29 may be omitted if less spring pressure is required in which case the peripheral edge of the disc 30 bears against the bearing plate 26. The shoulder 36 is sufficiently short in an axial direction to prevent interference with the tightening of the nut 31. Furthermore, if greater spring pressure is required, additional spring discs may be employed, the inner edges of these discs being supported by a spacing ring if desired, which ring is slidable on the hub.

In accordance with the patent statutes, I have described the principles of construction and operation of my improvement in torque clutch, and while I have endeavored to set forth the best embodiment thereof, I desire to have it understood that changes may be made within the scope of the following claims without departing from the spirit of my invention.

I claim:

1. A torque clutch including a bearing disc having an axially projecting hub provided with an end section formed with angularly and alternately disposed flat portions and threaded portions, a torque controlled member rotatably supported upon said hub, a pair of friction discs on opposite sides of said torque controlled member and rotatably supported relative to said hub, a bearing plate mounted upon said hub and held from rotation with respect thereto by internally disposed flat portions engageable with said flat portions on said hub, a clamping nut on said hub outwardly of said bearing plate, and a pair of opposed peripherally engaged concave washers interposed between said nut and said bearing plate.

2. The construction described in claim 1 and including an anti-friction bearing between said torque controlled member and said friction disc and said hub, said bearing having an axial length slightly less than the combined thickness of said torque controlled member and said friction discs.

3. The construction described in claim 1 and in which the end of said hub most remote from said disc is externally threaded, and is generally rectangular in cross section to provide said alternately disposed flat and threaded portions.

4. A torque controlled clutch including a disc having an axially projecting hub thereupon, a portion of said hub adjoining said disc having a substantially cylindrical outer surface, an anti-friction bearing mounted upon said surface, a torque control member supported by said bearing and extending outwardly therefrom, a pair of friction discs supported by said bearing on opposite sides of said torque controlled member, the end of said hub being threaded and being generally rectangular in cross section, a bearing plate supported by said hub and slidable axially thereupon, said bearing plate having a generally rectangular opening therethrough to engage the generally rectangular portion of said hub, a nut on the hub outwardly of said bearing plate, and a concavo-convex washer interposed between said nut and said bearing plate.

5. The construction described in claim 4 and including a second concavo-convex washer interposed between said nut and said bearing plate, the outer peripheries of said washers being in contact.

6. The construction described in claim 4 in which said hub has a bore for the reception of a shaft having a key thereon, said bore having a keyway angularly aligned with one of the threaded portions of said hub.

References Cited in the file of this patent

UNITED STATES PATENTS

| | | |
|---|---|---|
| 2,803,103 | Kollman | Aug. 20, 1952 |
| 2,857,750 | Fox | Oct. 28, 1958 |
| 2,862,376 | Thelander | Dec. 2, 1958 |